United States Patent
Hsu et al.

(10) Patent No.: US 6,847,405 B2
(45) Date of Patent: Jan. 25, 2005

(54) MOTION-ADAPTIVE DE-INTERLACING METHOD AND SYSTEM FOR DIGITAL TELEVISIONS

(75) Inventors: Chi-Yuan Hsu, San Jose, CA (US); Dzung Tien Hoang, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 285 days.

(21) Appl. No.: 09/953,465

(22) Filed: Sep. 14, 2001

(65) Prior Publication Data

US 2003/0052995 A1 Mar. 20, 2003

(51) Int. Cl.⁷ .............................................. H04N 11/00
(52) U.S. Cl. ....................................... 348/452; 348/700
(58) Field of Search ................................ 348/452, 448, 348/700, 699; 382/107, 239, 293

(56) References Cited

U.S. PATENT DOCUMENTS

| | | | |
|---|---|---|---|
| 5,305,104 A | * 4/1994 | Jensen et al. | 348/473 |
| 5,510,834 A | * 4/1996 | Weiss et al. | 348/97 |
| 5,579,054 A | * 11/1996 | Sezan et al. | 348/452 |
| 5,784,115 A | 7/1998 | Bozdagi | 348/452 |
| 5,943,099 A | 8/1999 | Kim | 348/448 |
| 6,205,178 B1 | * 3/2001 | Suzuki et al. | 375/240.15 |
| 6,269,484 B1 | * 7/2001 | Simsic et al. | 725/151 |
| 6,542,196 B1 | * 4/2003 | Watkins | 348/448 |
| 6,618,094 B1 | * 9/2003 | De Haan et al. | 348/448 |

FOREIGN PATENT DOCUMENTS

| | | | |
|---|---|---|---|
| EP | 0624032 A2 | 11/1994 | H04N/7/13 |

* cited by examiner

*Primary Examiner*—Victor R. Kostak
(74) *Attorney, Agent, or Firm*—Wagner, Murabito & Hao LLP

(57) ABSTRACT

One embodiment of the present invention provides a method and system for transforming a video bitstream in an interlaced format into a progressive format which can be displayed by a digital television. For example, the present embodiment utilizes the pixel information of a current field, previous field, and future field of the interlaced video bitstream to try to determine what the original content is of the missing lines of the current field. Specifically, the present embodiment utilizes different sets of pixel information in order to estimate the amount of motion that exist within a video bitstream. In this manner, the present embodiment is able to more closely determine the original value of the missing pixels of each field of the interlaced video bitstream. Therefore, the present embodiment provides a de-interlacing function enabling digital televisions to receive interlaced video bitstreams and display them in the progressive format.

20 Claims, 5 Drawing Sheets

MOTION-ADAPTIVE DE-INTERLACING METHOD AND SYSTEM FOR DIGITAL TELEVISIONS

TECHNICAL FIELD

The present invention relates to the field of broadcast formats of television programming. More specifically, the present invention relates to the field of transforming received television programming in an interlaced format into a progressive format.

BACKGROUND ART

Modern research and technology have provided society with a wide variety of electronic devices. It is appreciated that some of these modern electronic devices are very powerful and useful to their users. For example, some of the electronic devices which fall into this category include: computers which occupy large office space down to computers which are held in one's hand, satellites which orbit around earth relaying a multitude of communication signals, global positioning system (GPS) devices capable of determining the specific locations of their users on the earth, cellular phones which enable their users to communicate wirelessly with other people, to name a few. Additionally, it should be appreciated that some modern electronic devices also provide entertainment to their users. For instance, some of the electronic devices which fall into this category include: portable and fixed radio receivers which provide their users music along with a wide array of different audio programming, video game consoles which challenge their users with varying situations within different virtual realities, portable and fixed compact disc (CD) players which provide music to their users, and portable and fixed televisions which provide a wide variety of visual and audio programming to their users.

It is appreciated that television programming content is distributed to televisions of the general public in a wide variety of ways. For example, consumers of the general public are able to receive television programming content on their televisions within their households and/or businesses via coaxial cables, personal satellite dishes (large or small), antennas, broadband Internet, and the like. Furthermore, television programming content may be broadcast to the general public in different formats. For example, providers of television programming content typically broadcast their content to the general public in an interlaced format. Specifically, within the interlaced format, the broadcasters do not transmit all of the data associated with each frame (also referred to as a field) of the television video content. Instead, the broadcaster may transmit the even horizontal lines of a first frame of the video content while in the next frame it will transmit the odd horizontal lines. In this manner, broadcasters are taking advantage of the human eye which is unable to detect the missing alternating horizontal lines of the successive frames of video. Additionally, the broadcasters are conserving their transmission bandwidth by only transmitting half of the data of each video frame.

However, there are disadvantages associated with broadcasters transmitting their television programming content in the interlaced format. For example, digital televisions and high definition televisions (HDTV) are not initially designed to receive and handle television programming content in the interlaced format. Instead, digital televisions and high definition televisions are intentionally designed and fabricated to receive television programming content in a format referred to as a progressive format. As opposed to the interlaced format, the progressive format includes all of the picture data of each video frame within the video bitstream. In this manner, digital televisions and high definition televisions are able to provide their viewers a picture quality having a higher resolution than the conventional interlaced format televisions.

One solution to the above disadvantage is to modify digital televisions and high definition televisions such that they are able to handle television content received in the interlaced format. For example, one of the ways to enable digital televisions and high definition televisions to handle interlaced television content is to enable their hardware to double the pixel information of every received line of each frame and utilize that information to fill in the missing horizontal lines of that frame. However, there are disadvantages associated with this solution. One of the main disadvantages is that the resultant picture quality has poor resolution.

Another solution to the above disadvantage is to try to determine what the original content was of the missing horizontal lines of each frame of the interlaced television content. However, there are also disadvantages associated with this solution. One of the main disadvantages is that implementation of this type of solution typically can be complicated thereby increasing the overall production costs of the digital television or high definition television.

SUMMARY OF THE INVENTION

Accordingly, a need exists for a method and system for enabling a digital television and high definition television to transform an interlaced video bitstream into a progressive format in a cost effective manner that also provides good picture resolution. The present invention provides a method and system which accomplishes the above mentioned needs.

For example, one embodiment of the present invention provides a method and system for transforming a video bitstream in an interlaced format into a progressive format which can be displayed by a digital television. For example, the present embodiment utilizes the pixel information of a current field, previous field, and future field of the interlaced video bitstream to try to determine what the original content is of the missing lines of the current field. Specifically, the present embodiment utilizes different sets of pixel information in order to estimate the amount of motion that exist within a video bitstream. In this manner, the present embodiment is able to more closely determine the original value of the missing pixels of each field of the interlaced video bitstream. Therefore, the present embodiment provides a de-interlacing function enabling digital televisions to receive interlaced video bitstreams and display them in the progressive format.

In another embodiment, the present invention provides a system for transforming a video bitstream in an interlaced format into a progressive format. Specifically, the system comprises a turner means for receiving the video bitstream in the interlaced format. Additionally, the system comprises a video decoder means for determining a pixel level motion strength value by using a pixel of a current field, a pixel of a previous field, and a pixel of a future field of the video bitstream. The system also comprises the video decoder means for determining a MacroBlock motion strength value by using a first MacroBlock of the previous field and a second MacroBlock of the future field of the video bitstream. Moreover, the system comprises the video decoder means for determining a global motion strength value by using a first total pixel value of the previous field and a second total pixel value of the future field of the video bitstream. Furthermore, the system comprises the video decoder means for determining a value for a missing pixel of a missing line of the video bitstream in the interlaced format by using the pixel level motion strength value, the MacroBlock motion strength value, and the global motion strength value.

These and other advantages of the present invention will become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
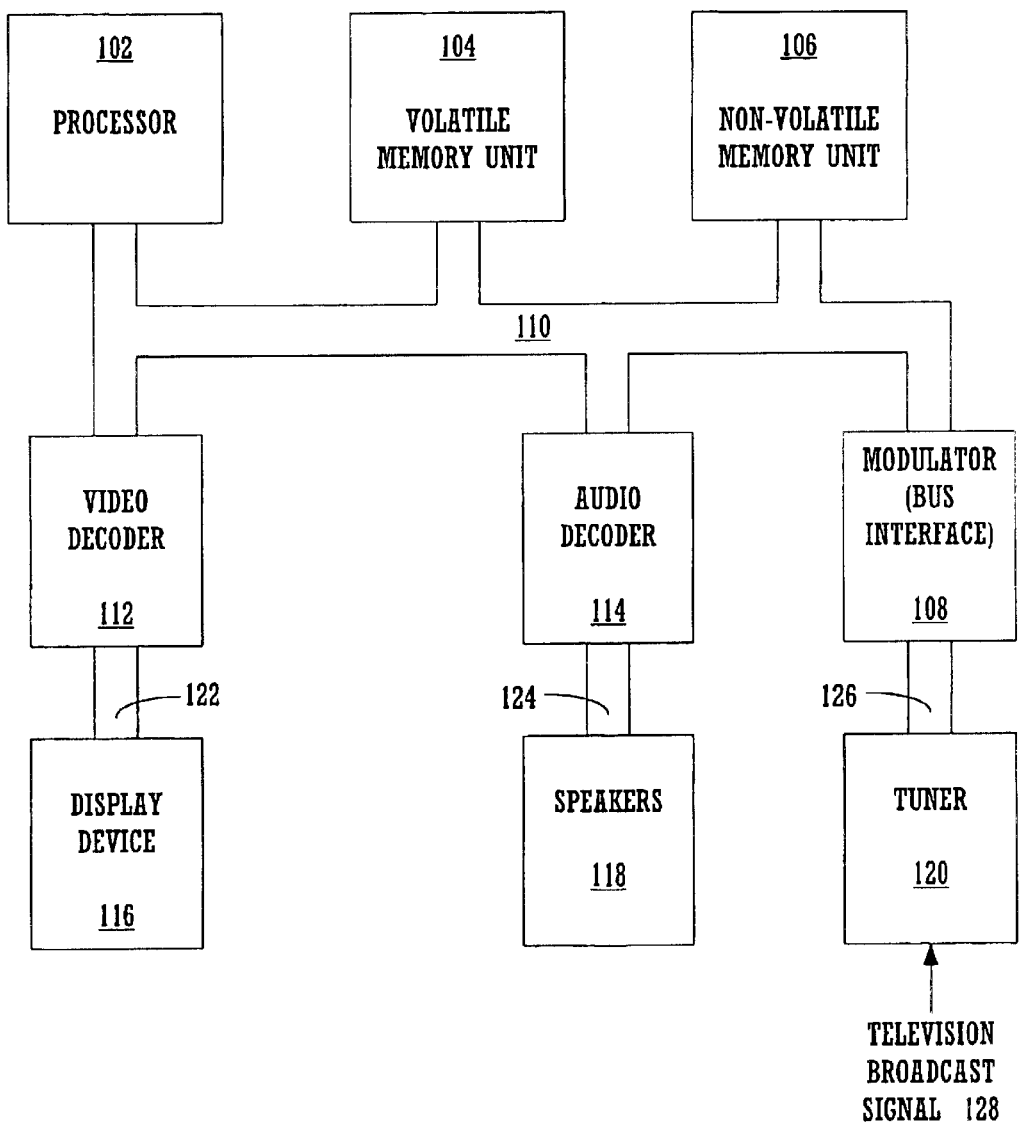
FIG. 1 is a block diagram of an exemplary digital television in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "receiving" or "outputting" or "storing" or "accessing" or "sending" or "quantizing" or the like, refer to the actions and processes of a consumer electronic media device, or similar electronic computing device (e.g., dedicated or embedded computer system), that manipulates and transforms data. The data are represented as physical (electronic) quantities within the consumer electronic media device's registers and/or memories and is transformed into other data similarly represented as physical quantities within the consumer electronic media device memories, registers, and/or other such information storage, transmission, or display screens.

Exemplary Digital Television System in Accordance with the Present Invention FIG. 1 is a block diagram of an exemplary digital television system 100 used in accordance with an embodiment of the present invention. It should be appreciated that system 100 is not strictly limited to be a digital television system. As such, system 100 of the present embodiment is well suited to be any type of electronic media device that handles television signals (e.g., set-top box, digital video recorder, and the like). Within the following discussions of the present invention, certain processes and steps are discussed that are realized, in one embodiment, as a series of instructions (e.g., software program) that reside within readable memory units of the digital television system 100 and executed by a processor(s) of system 100. When executed, the instructions cause digital television 100 to perform specific actions and exhibit specific behavior which is described in detail below.

Digital television system 100 of FIG. 1 comprises an address/data bus 110 for communicating information, one or more processors 102 coupled with bus 110 for processing information and instructions. It is understood that processor unit(s) 102 may be a microprocessor or any other type of processor. The digital television system 100 also includes data storage features such as a volatile memory unit 104 (e.g., random access memory, static RAM, dynamic RAM, etc.) coupled with bus 110 for storing information and instructions for processor(s) 102, a non-volatile memory unit 106 (e.g., read only memory, programmable ROM, flash memory, EPROM, EEPROM, etc.) coupled with bus 110 for storing static information and instructions for processor(s) 102. The digital television system 100 can also optionally include a data storage device (not shown), such as a magnetic or optical disk, and disk drive coupled with bus 110 for storing information and instructions.

System 100 also includes a video decoder 112 coupled to bus 110 and coupled to supply a video signal to, for example, digital display device 116 via bus 122. It should be appreciated that display device 116 may be a flat panel liquid crystal display (LCD), cathode ray tube (CRT), field emission display (FED), plasma display, or any other display device suitable for displaying video and/or graphic images recognizable to a user. Digital system 100 also includes an audio decoder 114 (e.g., a sound card) that is coupled to bus 110 and generates a digital audio signal over bus 124 which is coupled to external speakers 118. Any of a number of well known audio decoders can be used for audio decoder 114 of the present invention. It is understood that video decoder 112 processes video information from bus 110 and audio decoder 114 processes audio information from bus 110.

Digital television system 100 of FIG. 1 is coupled to receive television broadcast signal 128 from television head-end broadcaster (not shown). It should be appreciated that television broadcast signal 128 may be delivered to the digital television system 100 using a terrestrial line (e.g., cable TV) or it can be delivered via a wireless transmission mechanism (e.g., antenna, satellite system, and the like). The television broadcast signal 128 is received and processed by television system 100 via tuner 120. The tuner 120 is coupled to a modulator 108 via bus 126, and the modulator 108 is coupled to bus 110. The modulator 108 performs analog-to-digital conversion of the signals of bus 126 and also acts as a bus interface for bus 110. The modulator 108 and the tuner 120 are well known by those or ordinary skill in the art.

Under processor control from the processor 102, television audio/video information received from the tuner 120 is directed over bus 110 to the video decoder 112 and to the audio decoder 114. In this manner, the video decoder 112 is able to process and supply the video signal to display device 116 via bus 122 while the audio decoder 114 processes and supplies the audio signal to speakers 118 via bus 124. It is appreciated that bus 122 and bus 124 may be merged into one single larger bus carrying both video and audio data signals in accordance with the present embodiment.

Exemplary Operations in Accordance with the Present Invention

Figure 2:
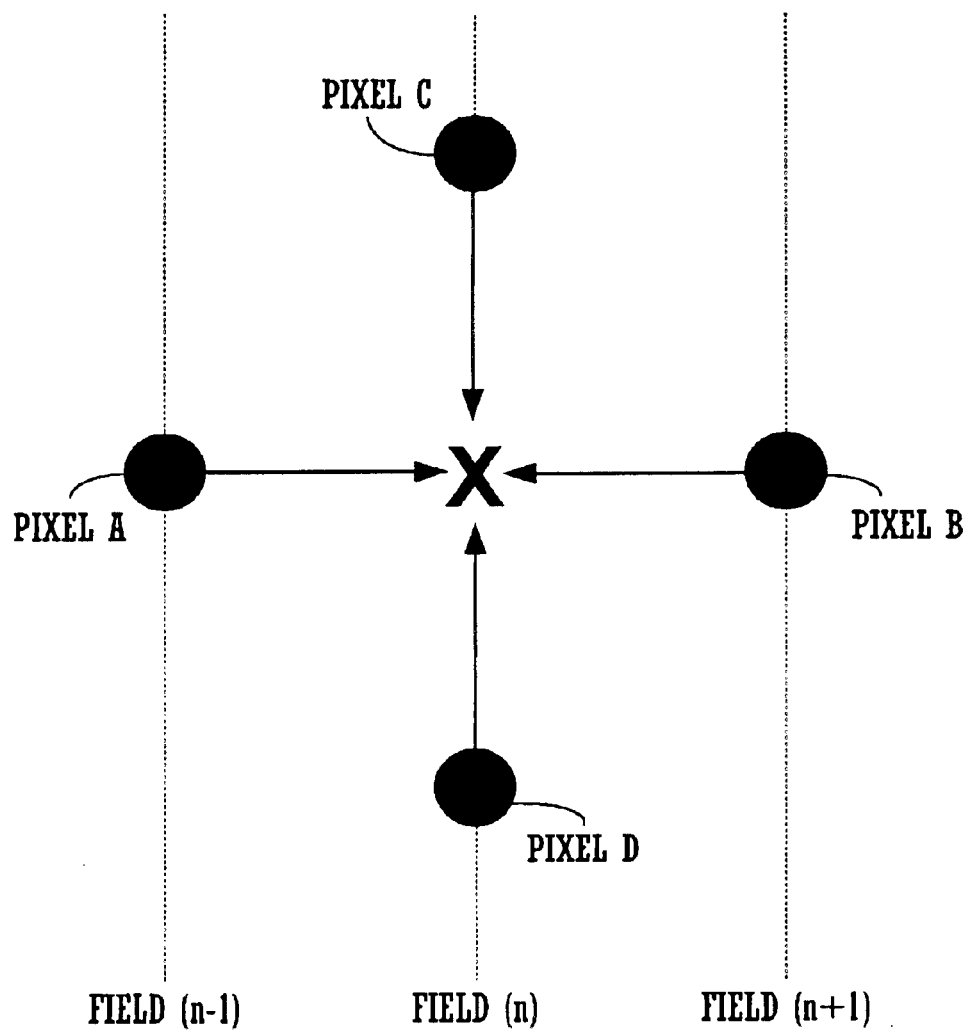
FIG. 2 is a diagram illustrating the spatial and temporal pixel interpolation utilized to recover missing pixel information in an interlaced video field in accordance with an embodiment of the present invention.
Figure 3:
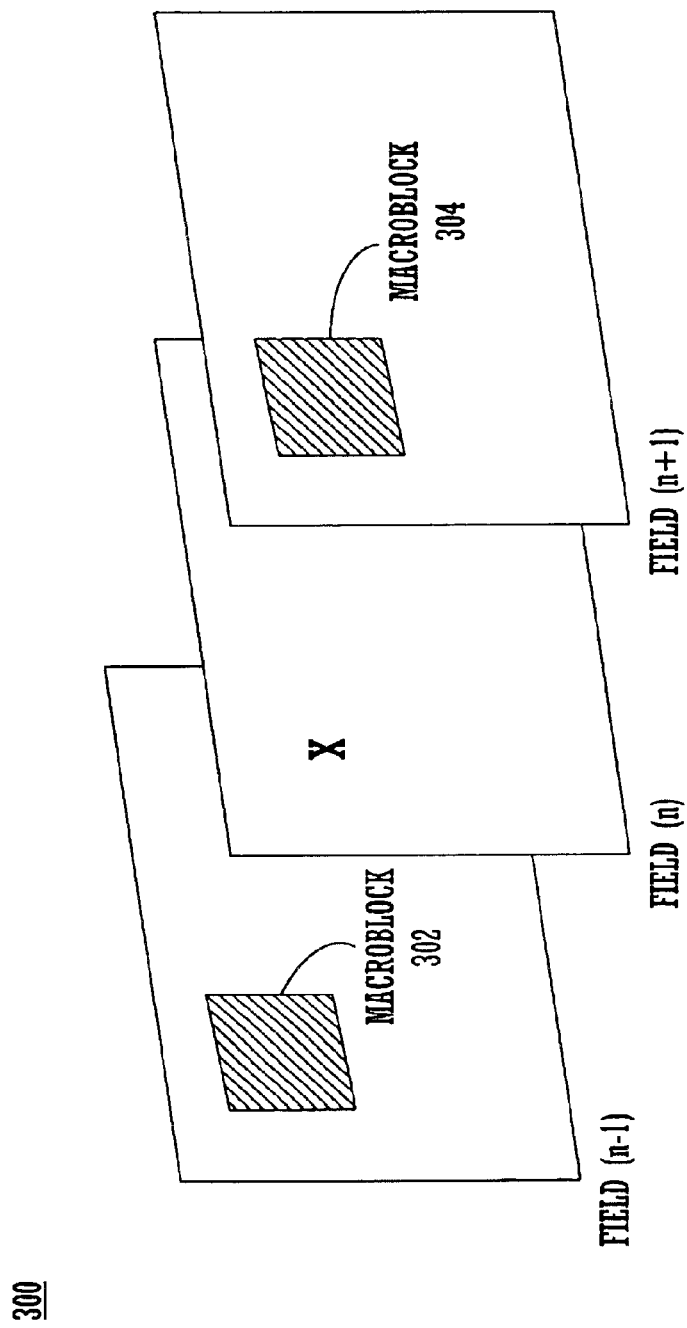
FIG. 3 is a diagram illustrating the determination of the MacroBlock motion strength which is utilized to determine the motion in the interlaced video sequence in accordance with an embodiment of the present invention.
Figure 4:
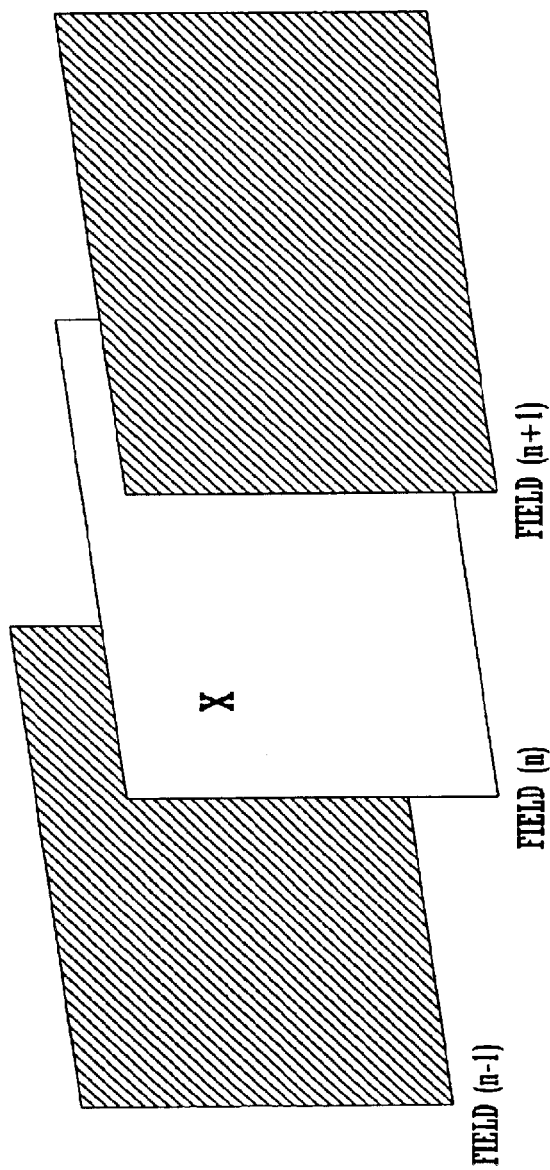
FIG. 4 is a diagram illustrating the determination of the Global Motion Strength which is utilized to determine the motion in the interlaced video sequence in accordance with an embodiment of the present invention.

An embodiment of the present invention provides a method and system for transforming a video bitstream in an interlaced format into a progressive format which can be displayed by a digital television (e.g., 100). More specifically, the present embodiment may operate on and be implemented as hardware and/or software of the digital television system 100. Within the present embodiment, the pixel information of a current field, previous field, and future field of an incoming interlaced video bitstream (e.g., 128) are utilized in order to try to determine what the original content is of the missing lines of the current field (also referred to as a frame). Furthermore, three different sets of pixel information are utilized to estimate the amount of motion that exist within the incoming video bitstream in order to more fully determine the original content of the missing pixels. Specifically, a dynamically weighted interpolation in both the temporal and spatial pixel axes is performed to recover missing pixel information. Additionally, to better estimate the motion in the video sequence, the dynamically weighted interpolation is also compensated by a determined difference between the direct current (DC) values of the MacroBlocks in the previous frame and the future frame (referred to as MacroBlock Motion Strength) along with a determined difference between the DC values of all of the pixels in the previous frame and the future frame (referred to as Global Motion Strength). FIGS. 2, 3, and 4 illustrate these different pixel level determinations in accordance with embodiments of the present invention.

FIG. 2 is a diagram 200 illustrating the spatial and temporal pixel interpolation utilized to recover missing pixel information in an interlaced video frame, e.g., Field (n), in accordance with an embodiment of the present invention. Specifically, diagram 200 illustrates a pixel level view of three fields (also referred to as frames) of an interlaced video bitstream that may be received by a digital television (e.g., 100). The X indicates a missing pixel of a line located within Field (n) which is referred to as the current field of the incoming interlaced video bitstream. Additionally, Field (n−1) is the previous field of the interlaced video bitstream that has already been shown on a display device (e.g., 116) while Field (n+1) is the future field that will be shown after Field (n). The present embodiment utilizes the pixel information associated with nearby pixels A, B, C, and D found in Fields (n−1), (n), and (n+1) in order to try to restore the data of missing pixel X. Pixel C is located above pixel X within Field (n) while pixel D is located below pixel C. It should be appreciated that the present embodiment is able to perform this functionality since Fields (n−1), (n), and (n+1) are stored within a memory device (e.g., volatile memory 104 and/or non-volatile memory 106) of digital television 100.

Within the present embodiment, the interpolation coefficients are dynamically adapted to the local pixel value difference in the temporal and spatial directions. That is, the interpolation weights more toward the temporal direction when the difference of the adjacent pixel values in the temporal axis (e.g., pixels A and B) is comparably smaller than that in the spatial axis (e.g., pixels C and D), indicating small local motion in the region of interest. However, the interpolation weights more toward the spatial direction when the difference of the adjacent pixel values in the temporal axis (e.g., pixels A and B) is comparably larger than that in the spatial axis (e.g., pixels C and D), indicating larger local motion in the region of interest. Accordingly, this approach finds a balance between the temporal interpolation, the process which is desired in the scenario of still video scenes, and the spatial interpolation, the process which is desired in the fast moving video scenes.

For example, the pixel level motion strength interpolation $(M_p)$ of Field (n) may be determined by the following relationship:

$$M_p = \text{Max}\left(\frac{|A-B|-t_{th}}{2^{t_Q}} - \frac{|C-D|-v_{th}}{2^{v_Q}}, 0\right)$$

where $t_{th}$ is a threshold value and $t_Q$ is a quantization factor for the temporal difference between pixels A and B while $v_{th}$ is a threshold value and $v_Q$ is a quantization factor for the spatial difference between pixels C and D. It is appreciated that the desired values of $t_{th}$, $t_Q$, $v_{th}$, and $v_Q$ may be determined through experimentation. One of the reasons for quantizing the temporal difference and the spatial difference is so that there are no floating point numbers to be handled by the hardware of digital television 100. In this manner, the present embodiment is much easier to implement within the existing hardware of digital television 100. Once the pixel level motion strength interpolation corresponding to pixel X of Field (n) has been determined, the present embodiment may store that information within memory (e.g., volatile memory 104 and/or non-volatile memory 106).

In order to better estimate the motion in an incoming video sequence, the above de-interlacing approach is also compensated by two other determinations of motion. One of the determinations of motion utilized by the present embodiment is the MacroBlock motion strength (MBMS). FIG. 3 is a diagram 300 illustrating the determination of the MacroBlock motion strength which is utilized to determine the motion in the interlaced video sequence in accordance with an embodiment of the present invention. It is appreciated that the word "MacroBlock" is terminology associated with digital video compression and is equal to a 16×16 square of pixels. The MacroBlock motion strength of the present embodiment may be a measure of the difference between the DC values of corresponding MacroBlocks in the previous Field (n−1) and the future Field (n+1). It should be appreciated that the MacroBlock level information may be obtained from the MPEG-2 (Moving Pictures Experts Group-2) decoding process that may be implemented within the video decoder 112 of digital television 100.

In order to determine the MacroBlock motion strength (MBMS) corresponding to pixel X within the present embodiment, the sub-block sum (SBS) of a MacroBlock of the previous Field (n−1) and of the future Field (n+1) corresponding to pixel X are first determined. Within an embodiment of the present invention, the sub-block sum of a MacroBlock of a field may be determined by summing all of the pixel values within the MacroBlock which corresponds to a pixel (e.g., X) of the current Field (n). For example, the sub-block sum of MacroBlock 302 of Field (n−1) may be determined by summing all of the pixel values within MacroBlock 302 which corresponds to the location of pixel X of Field (n). However, it should be understood that the DC value of a MacroBlock of a field is equivalent to the sub-block sum of that MacroBlock. Therefore, an embodiment of the present invention may determine the sub-block sum of a MacroBlock of a field by determining its DC value instead of summing all of the pixel values within that MacroBlock.

Once the sub-block sum (SBS) of a MacroBlock of the previous Field (n−1) and of the future Field (n+1) corresponding to pixel X are determined, the MacroBlock motion strength (MBMS) corresponding to pixel X of Field (n) may be determined by the following relationship:

$$MBMS(n)=|SBS(n+1)-SBS(n-1)|$$

where SBS(n+1) is equal to the sub-block sum of the MacroBlock (e.g., 304) of Field (n+1) which corresponds to the location of pixel X while SBS(n−1) is equal to the sub-block sum of the MacroBlock (e.g., 302) of Field (n−1) that also corresponds to the location of pixel X. Once the MacroBlock motion strength corresponding to pixel X of Field (n) has been determined, the present embodiment may store that value within memory (e.g., volatile memory 104 and/or non-volatile memory 106). As previously mentioned, it is appreciated that the sub-block sum may be obtained from the MPEG-2 decoding process that may be implemented within the video decoder 112 of digital television system 100.

The other determination of motion utilized by the present embodiment is the global motion strength (GMS). FIG. 4 is a diagram 400 illustrating the determination of the global motion strength which is utilized to determine the motion in the interlaced video sequence in accordance with an embodiment of the present invention. Specifically, the global motion strength is the measured difference between the DC values of all of the pixels in the previous Field (n−1) and the future Field (n+1). One of the reasons for determining the global motion strength is to be able to detect if there has been a scene change within the video content (which results in a large difference in the pixel values of adjacent fields). If there is a scene change within the video content, it is better that the present embodiment not perform the temporal interpolation but, instead, perform the spatial interpolation. The global motion strength (GMS) corresponding to pixel X of Field (n) may be determined by the following relationship:

$$GMS(n)=|\Sigma SBS(n+1)-\Sigma SBS(n-1)|$$

where ΣSBS(n+1) is equal to the summation of all of the sub-block sums of the MacroBlocks of Field (n+1) while ΣSBS(n−1) is equal to the summation of all of the sub-block sums of the MacroBlocks of Field (n−1). It should be understood that the global motion strength is determined once for each field of the incoming interlaced video bitstream. Once the global motion strength has been determined for Field (n), the present embodiment may store that value within memory (e.g., volatile memory 104 and/or non-volatile memory 106).

Within the present embodiment, the MacroBlock motion strength (MBMS) and the global motion strength (GMS) may be nonlinearly quantized before being used in the de-interlacing relationship described below. For example, the MacroBlock motion strength may be nonlinearly quantized by using the following relationship:

$$M_b=(MBMS-b_{th})/2^{b_Q}$$

where $b_{th}$ is a threshold value and $b_Q$ is a quantization factor. It should be appreciated that the desired values for $b_{th}$ and $b_Q$ may be determined through experimentation. Furthermore, the global motion strength (GMS) may be nonlinearly quantized by using the following relationship:

$$Mg=(GMS-g_{th})/2^{g_Q}$$

where $g_{th}$ is a threshold value and $g_Q$ is a quantization factor. The desired values for $g_{th}$ and $g_Q$ may be determined through experimentation. One of the reasons for quantizing the MacroBlock motion strength (MBMS) and the global motion strength (GMS) is so no floating point numbers are handled by the hardware of a typical digital television system (e.g., 100). In this manner, the present embodiment is much easier and cheaper to implement within the hardware of digital television 100. As such, the present embodiment is a very cost effective solution for digital television applications.

Once the quantized global motion strength ($M_g$), quantized MacroBlock motion strength ($M_b$), and the quantized pixel level motion strength ($M_p$) have been determined, the total motion strength may be determined. That is, the total motion strength (M) may be determined using the following relationship:

$$M=M_p+M_b+M_g$$

It should be understood that the selection of the threshold values and quantization factors (e.g., $t_{th}$, $t_Q$, $v_{th}$, $v_Q$, $b_{th}$, $b_Q$, $g_{th}$ and $g_Q$) mentioned herein may be specifically determined to ensure that the resulting value of the total motion strength (M) falls between some pre-defined dynamic range. For example, the dynamic range of the total motion strength (M) may be pre-defined as:

$$0 \leq M \leq M_{Max}$$

where $M_{Max}$ is equal to 255. However, it is appreciated that $M_{Max}$ of the present embodiment is well suited to be any value. Additionally, the present embodiment is well suited to have any pre-defined dynamic range (e.g., including positive and/or negative values) of the total motion strength (M).

Once the total motion strength (M) has been determined, the de-interlaced pixel value of pixel X may be determined using the following relationship:

$$X = \frac{(M \cdot |A-B|) + ((M_{Max}-M) \cdot |C-D|)}{M_{Max}}$$

where A, B, C, and D are the values of pixels A, B, C, and D of Fields (n−1), (n), and (n+1). It is understood that the determined value of X is equal to the value of missing pixel X of the current Field (n). Once the X value is determined, it may be stored by the present embodiment and also output to the display device 116 of digital television 100. In this manner, the present embodiment is able to determine the de-interlaced pixel value of each pixel missing from each field of an interlaced video bitstream.

It should be understood that the pixel level motion strength, MacroBlock motion strength, and the global motion strength of the present embodiment are well suited to not be quantized before being used in the de-interlacing of pixel X relationship described above. However, if the pixel level motion strength, MacroBlock motion strength, and the global motion strength are not quantized, the hardware of the digital television system (e.g., 100) may have to be augmented such that it can handle floating point numbers that may result from these different determinations. Furthermore, this floating point hardware typically increases the manufacturing cost of the digital television system (e.g., 100).

Figure 5:
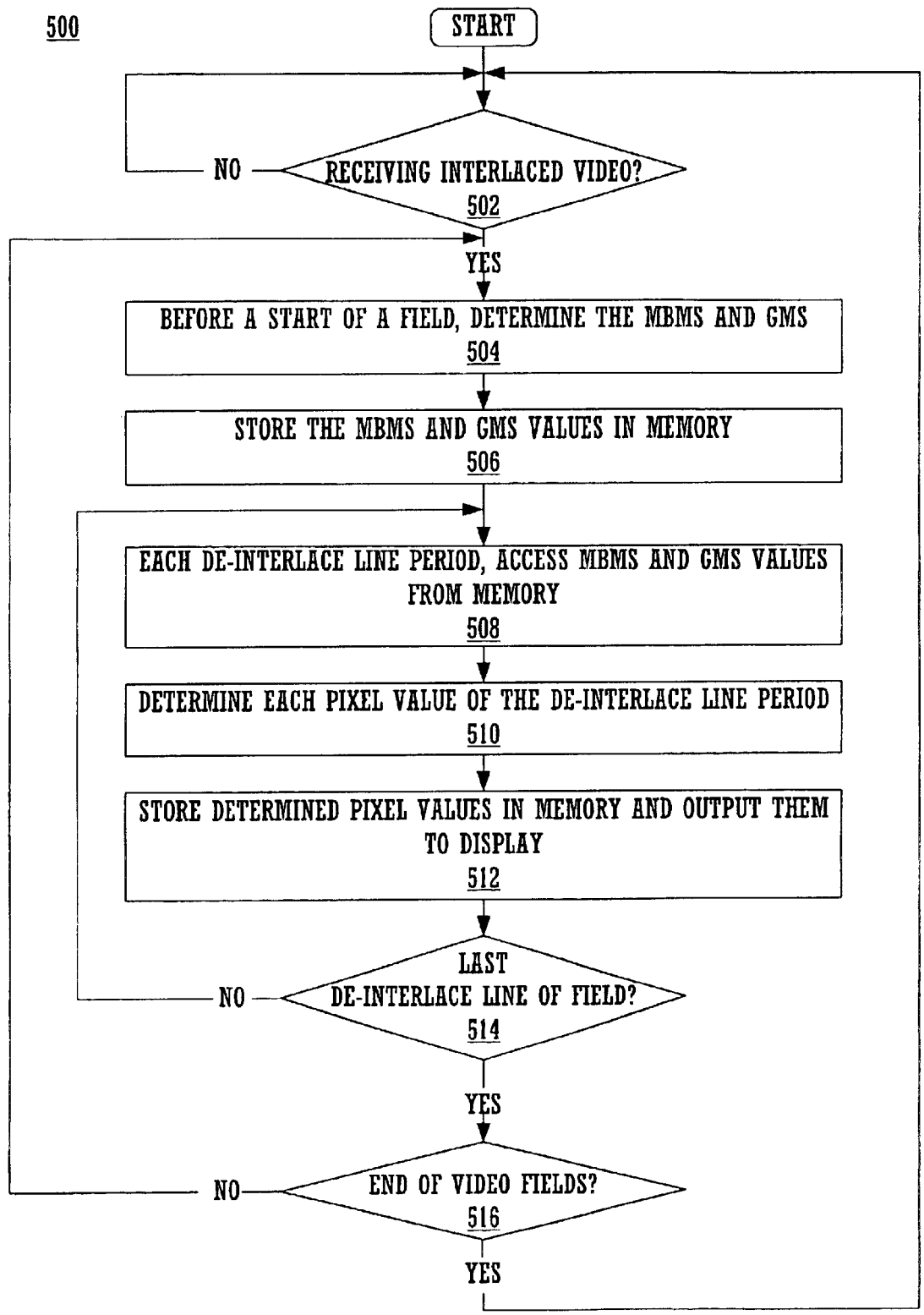
FIG. 5 is a flowchart of steps performed in accordance with an embodiment of the present invention for transforming a video bitstream in an interlaced format into a progressive format which can be displayed by a digital television.

FIG. 5 is a flowchart 500 of steps performed in accordance with an embodiment of the present invention for transforming a video bitstream in an interlaced format into a progressive format which can be displayed by a digital television (e.g., 100). Flowchart 500 includes processes of the present invention which, in one embodiment, are carried out by a processor and electrical components under the control of readable and executable instructions. The readable and executable instructions reside, for example, in data storage features such as volatile memory 104 and/or non-volatile memory 106 of FIG. 1. However, the readable and executable instructions may reside in any type of readable medium. Although specific steps are disclosed in flowchart 500, such steps are exemplary. That is, the present embodiment is well suited to performing various other steps or variations of the steps recited in FIG. 5. Within the present embodiment, it should be appreciated that the steps of flowchart 500 may be performed by software, by hardware, or by any combination of software and hardware.

The present embodiment of flowchart 500 provides a method and system for transforming a video bitstream in an interlaced format into a progressive format which can be displayed by a digital television (e.g., 100). More specifically, the pixel information of a current field, previous field, and future field of an incoming interlaced video bitstream (e.g., 128) are utilized by the present embodiment to try to determine the original content of the missing lines of the current field (also referred to as a frame). Furthermore, three different sets of pixel information are utilized to estimate the amount of motion that exist within the incoming video bitstream in order to more fully determine the original content of the missing pixels. Specifically, a dynamically weighted interpolation in both the temporal and spatial pixel axes is performed to recover missing pixel information. Additionally, the dynamically weighted interpolation is also compensated by a determination of the MacroBlock motion strength (MBMS) and the global motion strength (GMS).

In step 502 of FIG. 5, the present embodiment determines whether the digital television (e.g., 100) is receiving an interlaced video bitstream. If the present embodiment determines at step 502 that the digital television is not receiving an interlaced video bitstream, the present embodiment proceeds to the beginning of step 502. However, if the present embodiment determines at step 502 that the digital television is receiving an interlaced video bitstream, the present embodiment proceeds to step 504. It is appreciated that the determination made during step 502 as to whether the digital television is receiving an interlaced video bitstream may be performed in a wide variety of ways in accordance with the present embodiment. For example, the present embodiment may utilize coding embedded within the incoming interlaced video bitstream in order to determine its format.

At step 504, before the start of a field, e.g., during the video blank interval (VBI), of the incoming video bitstream, the present embodiment determines the MacroBlock motion strength (MBMS) and the global motion strength (GMS) corresponding to the present field. It is understood that the determinations made during step 504 may be performed in a variety of ways in accordance with the present embodiment. For example, at step 504 the present embodiment may determine the MacroBlock motion strength and the global motion strength in a manner similar to that described herein with reference to FIGS. 3 and 4. It should be appreciated that the first and last fields of the incoming video bitstream may need to be handle differently than the intervening video fields. One of the reasons for this is that the first field of the incoming video does not have a previous field while the last field does not have a future field. Therefore, one way the present embodiment may handle the first field at step 504 is to utilize the pixel information of the first field (instead of a previous field) and the next field in order to determining the MacroBlock motion strength and the global motion strength of the first field. Additionally, the present embodiment may handle the last field at step 504 by utilize the pixel information of the last field (instead of a future field) and the previous field in order to determining the MacroBlock motion strength and the global motion strength of the last field.

In step 506 of FIG. 5, the present embodiment stores the MacroBlock motion strength values and the global motion strength value corresponding to the current video field within memory (e.g., volatile memory 104 and/or non-volatile memory 106). It is understood that the present embodiment may store the MacroBlock motion strength values and the global motion strength value in any type of memory device. At step 508, the present embodiment accesses the MacroBlock motion strength (MBMS) values and the global motion strength (GMS) value corresponding to a line of missing pixel values (also known as a de-interlace line period) of the current video field.

At step 510, the present embodiment determines each pixel value of the current de-interlace line period. It is appreciated that the determination of each pixel value of the current de-interlace line period at step 510 may be performed in a wide variety of ways in accordance with the present embodiment. For example, the determination of each pixel value of the current de-interlace line period at step 510 may be performed by the present embodiment in a manner similar to that described herein with reference to FIGS. 1, 2, 3, and 4. In step 512, the present embodiment stores within memory (e.g., volatile memory 104 and/or non-volatile memory 106) the pixel values determined at step 510 and also outputs those pixel values to a display device (e.g., 116).

In step 514, the present embodiment determines whether the current de-interlace line is the last one of the current video field. If the present embodiment determines at step 514 that the current de-interlace line is not the last one of the current video field, the present embodiment proceeds to the beginning of step 508. However, if the present embodiment determines at step 514 that the current de-interlace line is the last one of the current video field, the present embodiment proceeds to step 516. At step 516, the present embodiment determines whether the current field is the last one of the incoming video bitstream. If the present embodiment determines at step 516 that the current field is not the last one of the incoming video bitstream, the present embodiment proceeds to the beginning of step 504. Conversely, if the present embodiment determines at step 516 that the current field is the last one of the incoming video bitstream, the present embodiment proceeds to the beginning of step 502.

Accordingly, the present invention provides a method and system for enabling a digital television and high definition television to transform an interlaced video bitstream into a progressive format in a cost effective manner that also provides good picture resolution.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for transforming a video in an interlaced format into a progressive format, the method comprising:

receiving said video in said interlaced format;

determining a pixel level motion strength value by using a pixel of a current field, a pixel of a previous field, and a pixel of a future field of said video;

determining a MacroBlock motion strength value by using a first MacroBlock of said previous field and a second MacroBlock of said future field of said video;

determining a global motion strength value by using a firs total pixel value of said previous field and a second total pixel value of said future field of said video; and determining a value for a missing pixel of a missing line of said video in said interlaced format by using said pixel level motion strength value, said MacroBlock motion strength value, and said global motion strength value.

2. The method as described in claim 1 wherein said missing pixel is located within said current field of said video.

3. The method as described in claim 1 wherein said receiving said video is performed by a digital television.

4. The method as described in claim 1 wherein said receiving said video is performed by a digital set-top box.

5. The method as described in claim 1 wherein said receiving said video is performed by an electronic media device that handles digital television signals.

6. The method as described in claim 1 wherein said determining said global motion strength value further comprises:

determining a difference between said first total pixel value of said previous field and said second total pixel value of said future field of said video.

7. The method as described in claim 1 wherein said determining said MacroBlock motion strength value further comprises:

determining a difference between said first MacroBlock of said previous field and said second MacroBlock of said future field of said video.

8. A system for transforming a video bitstream in an interlaced format into a progressive format, the system comprises:

a turner means for receiving said video bitstream in said interlaced format;

a video decoder means for determining a pixel level motion strength value by using a pixel of a current field, a pixel of a previous field, and a pixel of a future field of said video bitstream;

said video decoder means for determining a MacroBlock motion strength value by using a first MacroBlock of said previous field and a second MacroBlock of said future field of said video bitstream;

said video decoder means for determining a global motion strength value by using a first total pixel value of said previous field and a second total pixel value of said future field of said video bitstream; and said video decoder means for determining a value for a missing pixel of a missing line of said video bitstream in said interlaced format by using said pixel level motion strength value, said MacroBlock motion strength value, and said global motion strength value.

9. The system as described in claim 8 wherein said missing pixel is located within said current field of said video bitstream.

10. The system as described in claim 8 wherein said tuner is part of a digital television.

11. The system as described in claim 8 wherein said tuner is part of a digital set-top box.

12. The system as described in claim 8 wherein said tuner is part of an electronic media device that handles digital television signals.

13. The system as described in claim 8 wherein said system further comprises:

said video decoder means for determining said global motion strength value by determining a difference between said first total pixel value of said previous field and said second total pixel value of said future field of said video bitstream.

14. The system as described in claim 8 wherein said system further comprises:

said video decoder means for determining said MacroBlock motion strength value by determining a difference between said first MacroBlock of said previous field and said second MacroBlock of said future field of said video bitstream.

15. A method for transforming a video bitstream in an interlaced format into a progressive format, the method comprising:

receiving said video bitstream in said interlaced format;

determining a pixel level motion strength value by using pixel of a current field, a pixel of a previous field, and a pixel of a future field of said video bitstream;

determining a MacroBlock motion strength value by using first MacroBlock of said previous field and a second MacroBlock of said future field of said video bitstream;

determining a global motion strength value by using a first total pixel value of said previous field and a second total pixel value of said future field of said video bitstream; and determining a value for a missing pixel of a missing line of said video bitstream in said interlaced format by using said pixel level motion strength value, said MacroBlock motion strength value, and said global motion strength value, wherein said missing pixel is located within said current field of said video bitstream.

16. The method as described in claim 15 wherein said receiving said video bitstream is performed by a digital television.

17. The method as described in claim 15 wherein said receiving said video bitstream is performed by a digital set-top box.

18. The method as described in claim 15 wherein said receiving said video bitstream is performed by an electronic media device that handles digital television signals.

19. The method as described in claim 15 wherein said determining said global motion strength value further comprises:

determining a difference between said first total pixel value of said previous field and said second total pixel value of said future field of said video bitstream.

20. The method as described in claim 15 wherein said determining said MacroBlock motion strength value further comprises:

determining a difference between said first MacroBlock of said previous field and said second MacroBlock of said future field of said video bitstream.

* * * * *